(No Model.) 2 Sheets—Sheet 2.
J. W. HARRIS & T. J. THOMAS.
SECTIONAL ROPE SHEAVE.
No. 449,322. Patented Mar. 31, 1891.
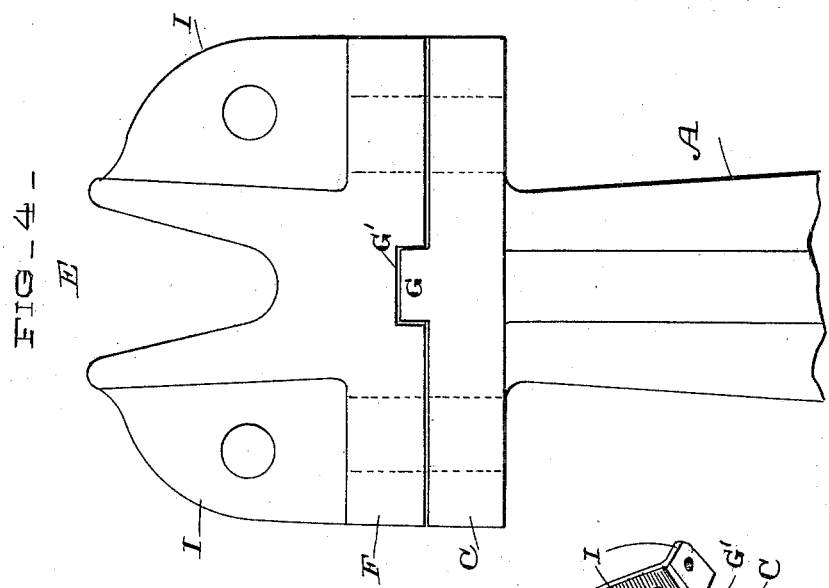
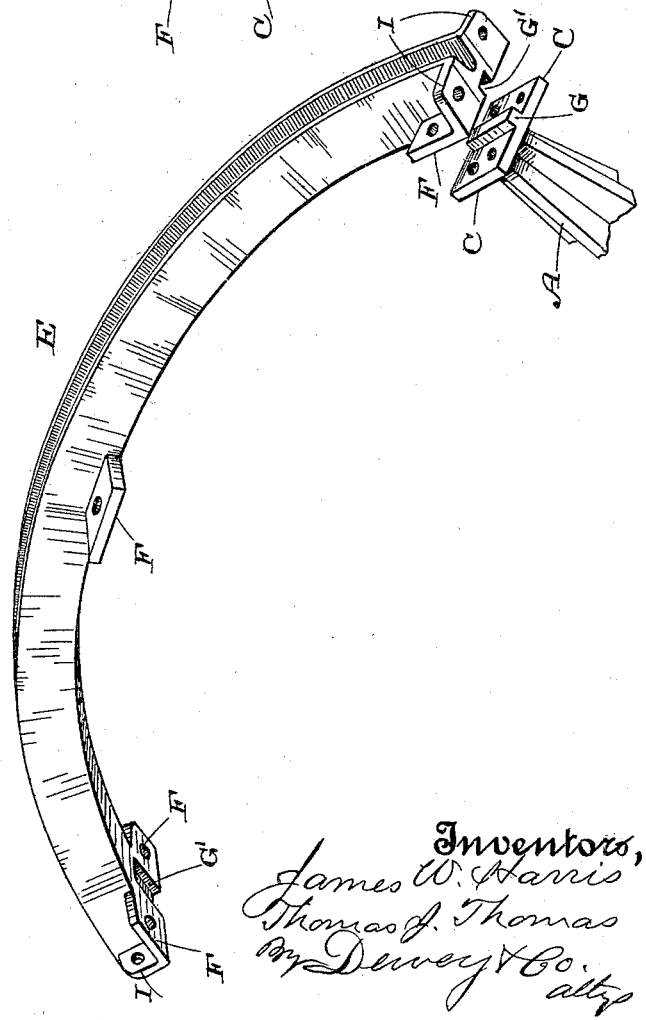

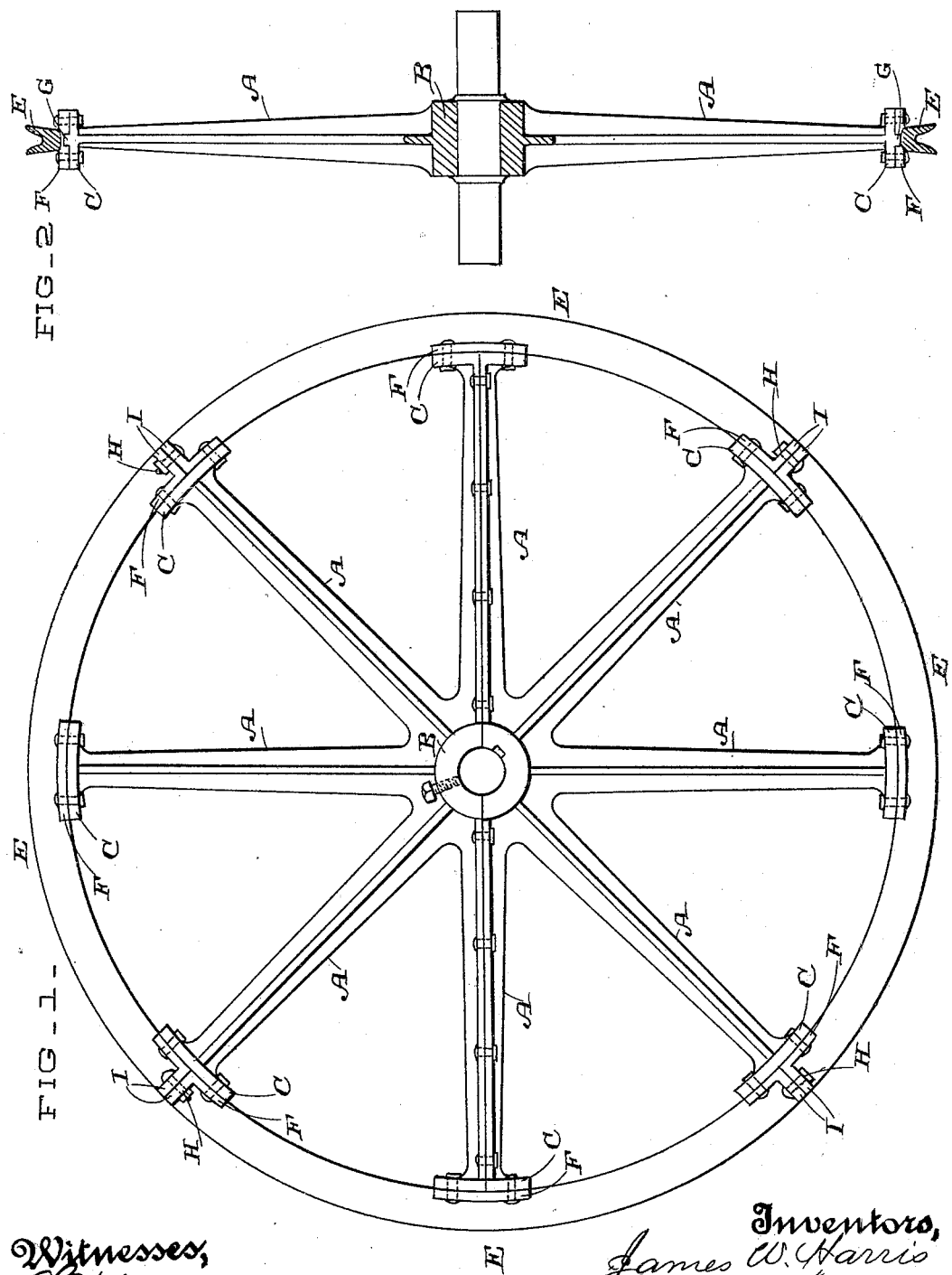

UNITED STATES PATENT OFFICE.

JAMES WM. HARRIS AND THOMAS JOHN THOMAS, OF SAN FRANCISCO, CALIFORNIA.

SECTIONAL ROPE-SHEAVE.

SPECIFICATION forming part of Letters Patent No. 449,322, dated March 31, 1891.

Application filed October 2, 1890. Serial No. 366,891. (No model.)

*To all whom it may concern:*

Be it known that we, JAMES WILLIAM HARRIS and THOMAS JOHN THOMAS, citizens of the United States, residing in the city and county of San Francisco, State of California, have invented an Improvement in Sectional Rope-Sheaves; and we hereby declare the following to be a full, clear, and exact description of the same.

Our invention relates to an improvement in the construction of sheaves around which wire or other ropes are designed to travel.

It consists in a sectional construction of said sheaves and in certain details of construction, which will be more fully explained by reference to the accompanying drawings, in which—

Figure 1 is a plan view of our improved sheave complete. Fig. 2 is a transverse section of the same. Fig. 3 is a perspective view of one of the sections of the rim and a portion of one of the arms. Fig. 4 is an enlarged edge view of a part of the sheave.

This invention is especially designed for use in the construction of large pulleys or sheaves of many feet in diameter, having a peripheral groove, around which wire or other rope is passed either for the purpose of changing its direction or of transmitting motion through the pulley. The rims of these sheaves wear out quite rapidly under the friction caused by the incessant rubbing of the steel-wire ropes, which are used in cable railways, and for other similar purposes, and in order to readily replace these rims or portions of them and to reduce the expense we construct the central portion of the wheel with its arms or spider separate from the rim and the rim in several sections with a means for accurately fitting said sections together and securing them upon the ends of the arms of the wheel, so that when completed a perfect and evenly-running wheel will be the result.

A A are the arms or spokes of the wheel, which are cast with and radiate from the hub B. We prefer, in large wheels, to cast the hub in two parts with half of the spokes attached to each half of the hub, and it is then bolted together, so as to form a complete hub with the radiating spokes. Upon the outer ends of these spokes are cast the transverse lugs C, which project a sufficient distance outside of the arms to admit of holes being made through them, through which bolts pass to secure the rim upon the ends of these arms or spokes.

The rim is made in sections E, grooved or channeled around the outer periphery, for the purpose of receiving and guiding the rope which has to pass around the pulley, and these sections have lugs F projecting from their sides at such intervals as to correspond with the lugs C upon the ends of the spokes of the wheel. In order to fit these parts perfectly together, the ends of the spokes are first turned off by securing the wheel upon the face-plate of a lathe or upon the bed of a boring-machine, and in turning off the ends of the spokes and the projecting lugs to which the rim is to be bolted we form a projecting rib G in the center of each of the lugs, as shown.

In the present case we have shown the wheel-rim as composed of four sections and the central portion of the wheel as having eight arms or spokes radiating from the hub, so that the central portion of each of the rim-sections will be bolted to and supported upon one of the arms, while the abutting ends of each two adjacent rim-sections meet upon an intermediate arm or spoke, where they are bolted.

The rim-sections are first secured together by means of bolts H, passing through lugs I upon the sides of their adjacent ends, so as to form a complete rim, which is centered and secured upon the face-plate of the lathe or upon the bed of the boring-machine, and the inner circumference of the rim is then turned out, so as to make it true and to fit exactly upon the ends of the arms or spokes of the wheel. In turning these rim-sections grooves or channels G' are formed in the center, which exactly correspond with the projecting ribs G upon the ends of the arms or spokes. This work is all done by the use of templets in the usual manner for constructing large work of this description, when it will be manifest that any number of rim-sections made and fitted in this manner may be interchangeably fitted upon the arms of different wheels, so as to form a complete wheel. When these have all been fitted, holes are bored through the projecting lugs C upon the ends of the wheel-arms and the corresponding lugs F upon the rim-sections, so that they may be firmly bolted together. The central ribs and channels which have been turned in finishing up these parts serve to hold the rim-sections exactly in place, and when they are all bolted together they will form a perfectly evenly-running wheel.

Any rim-section may be removed and another one introduced without throwing the rope off the wheel by simply turning the wheel so that the section to be removed lies on the inside and between the two parts of the rope, which are tangent to the wheel-rim.

Having thus described our invention, what we claim as new, and desire to secure by Letters Patent, is—

1. The improvement in wheels, consisting of the central hub with the radial arms, the transversely-projecting lugs at the outer ends of the arms, a wheel-rim formed in sections, provided with simliar transverse lugs adapted to fit upon said arms, bolts passing through holes in the lugs, so as to secure the rim-sections to the arms, and centrally-disposed ribs upon the ends of the arms and a corresponding groove in the rim to fit said ribs, substantially as herein described.

2. In a wheel composed of a central hub and radial arms and independent rim-sections, the lugs upon the ends of the arms, corresponding lugs upon the rim-sections, and bolts by which they are secured together, and the supplemental lugs I upon the abutting ends of the rim-sections, with holes and bolts whereby they are secured together, substantially as herein described.

In witness whereof we have hereunto set our hands.

JAMES WM. HARRIS.
THOMAS JOHN THOMAS.

Witnesses:
H. C. PIRER,
HARRY J. LASK.